(12) United States Patent
Kim

(10) Patent No.: US 10,293,672 B2
(45) Date of Patent: May 21, 2019

(54) ENGINE MOUNT AND METHOD OF MANUFACTURING THE SAME

(71) Applicants: Hyundai Motor Company, Seoul (KR); Kia Motors Corporation, Seoul (KR)

(72) Inventor: Seung-Won Kim, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 17 days.

(21) Appl. No.: 15/646,805

(22) Filed: Jul. 11, 2017

(65) Prior Publication Data

US 2018/0162211 A1 Jun. 14, 2018

(30) Foreign Application Priority Data

Dec. 12, 2016 (KR) .................... 10-2016-0168327

(51) Int. Cl.
| | |
|---|---|
| *B60K 5/12* | (2006.01) |
| *F16F 13/10* | (2006.01) |
| *F16F 13/14* | (2006.01) |
| *F16F 15/00* | (2006.01) |
| *B21C 23/14* | (2006.01) |

(52) U.S. Cl.
CPC .............. *B60K 5/1208* (2013.01); *B60K 5/12* (2013.01); *B60K 5/1283* (2013.01); *B60K 5/1291* (2013.01); *F16F 13/10* (2013.01); *F16F 13/105* (2013.01); *F16F 13/14* (2013.01); *B21C 23/142* (2013.01); *F16F 15/00* (2013.01);

(Continued)

(58) Field of Classification Search
CPC .. B60K 5/1208; B60K 5/1283; B60K 5/1291; B60K 5/12; F16F 13/10; F16F 13/105; F16F 13/14; F16F 2228/066; F16F 2234/04; F16F 2230/18; F16F 15/00
See application file for complete search history.

(56) References Cited

U.S. PATENT DOCUMENTS

| | | |
|---|---|---|
| 5,330,166 A | 7/1994 | Aoki |
| 6,427,814 B1 | 8/2002 | Miyamoto |

(Continued)

FOREIGN PATENT DOCUMENTS

| | | |
|---|---|---|
| JP | 04-166410 A) | 6/1992 |
| JP | 2715699 (B2) | 11/1997 |

(Continued)

*Primary Examiner* — Tan Le
(74) *Attorney, Agent, or Firm* — Morgan, Lewis & Bockius LLP

(57) ABSTRACT

An engine mount may include: a support device; a bracket device; and a vibration proof device which connects the support device and the bracket device, and, in which the vibration proof device may include a nozzle device fastened to the support device, and has a nozzle plate dividing an internal space of the vibration proof device into a first liquid chamber and a second liquid chamber, and a flow path penetrating the nozzle plate; a first insulator defining the first liquid chamber together with the nozzle plate; a first core protruding from the first insulator toward one side, and fastened to the bracket device; a second insulator defining the second liquid chamber together with the nozzle plate; and a second core protruding from the second insulator and fastened to the bracket device.

12 Claims, 12 Drawing Sheets

(52) U.S. Cl.
CPC ..... *F16F 2228/066* (2013.01); *F16F 2230/18* (2013.01); *F16F 2234/04* (2013.01)

(56) References Cited

U.S. PATENT DOCUMENTS

| | | | |
|---|---|---|---|
| 8,973,704 B2* | 3/2015 | Kim | F16F 13/10 |
| | | | 181/207 |
| 9,242,541 B2* | 1/2016 | Kim | F16F 15/08 |
| 9,784,335 B1* | 10/2017 | Han | B60K 5/1208 |
| 2005/0178943 A1* | 8/2005 | Tsutsumida | B60K 5/1291 |
| | | | 248/560 |
| 2013/0292888 A1* | 11/2013 | Hwang | F16F 13/08 |
| | | | 267/140.13 |
| 2017/0267090 A1* | 9/2017 | Kim | B60K 5/1208 |
| 2018/0162212 A1* | 6/2018 | Kim | B60K 5/12 |

FOREIGN PATENT DOCUMENTS

| | | |
|---|---|---|
| JP | 2002-147518 (A) | 5/2002 |
| JP | 2006-062521 (A) | 3/2006 |
| KR | 20-153470 (Y1) | 8/1999 |

* cited by examiner

ENGINE MOUNT AND METHOD OF MANUFACTURING THE SAME

CROSS-REFERENCE(S) TO RELATED APPLICATIONS

The present application claims priority to Korean Patent Application No. 10-2016-0168327, filed on Dec. 12, 2016, the entire contents of which is incorporated herein for all purposes by this reference.

BACKGROUND OF THE INVENTION

Field of the Invention

The present invention relates to an engine mount which is mounted on a vehicle body to support an engine, and may change the damping characteristics in accordance with characteristics of vibration transmitted from the engine.

Description of Related Art

An engine of a vehicle is disposed in an engine compartment of a vehicle body by an engine mount to attenuate vibrations in the engine. Based on the internal configuration of the engine mount applied to the vehicle, the engine mount may be classified into a rubber mount which insulates vibration by use of the elastic force of rubber, and a fluid-filled mount (hydraulic mount) which insulates vibrations by use of an encapsulated hydraulic liquid, and based on the shape of the fluid-filled mount the fluid-filled mount may be broadly classified into a conical fluid mount and a box-like fluid mount.

FIG. 1A and FIG. 1B are views illustrating a conical fluid mount in the related art, and FIG. 2A and FIG. 2B are views illustrating a box-like fluid mount in the related art.

Referring to FIG. 1A and FIG. 1B, a conical fluid mount 1 in the related art is formed in an approximately cylindrical shape, and has therein a conical insulator and a circular flow path (orifice), easily adjusting the flow of a fluid within the mount. The advantage of the conical fluid mount 1 is that it is possible to appropriately design a loss factor by applying the circular flow path, and the conical fluid mount 1 is advantageous in terms of durability because the thickness of the insulator is changed less. However, there are problems in that a level difference from an engine support is increased because a core needs to be mounted at an upper side of the conical insulator, and the dynamic stiffness of the support deteriorates.

Meanwhile, referring to FIG. 2A and FIG. 2B, a box-like fluid mount 2 in the related art has an advantageous structure in terms of costs, weight, and dynamic stiffness because it is possible to reduce the level difference from the engine support in comparison with the conical fluid mount 1. However, there are problems in that the pumping region may be insufficient because a quadrangular insulator is disposed in the box-like fluid mount 2, and the box-like fluid mount 2 is disadvantageous in terms of fluid characteristics as the flow path is formed in a quadrangular shape, and a portion of the insulator where the thickness is small is damaged.

Since the two types of mounts have clearly different advantages and disadvantages, there is a problem in that it is difficult to apply an optimized shape to the vehicle.

The information disclosed in this Background of the Invention section is only for enhancement or understanding of the general background of the invention and should not be taken as an acknowledgement or any form of suggestion that this information forms the prior art already known to a person skilled in the art.

BRIEF SUMMARY

Various aspects of the present invention are directed to providing a structure of a fluid mount configured for reducing a level difference from an engine support even while adopting a conical insulator.

The present invention has also been made in an effort to provide an improved structure of a fluid mount configured for improving the durability and a damping ratio of an insulator.

The present invention has also been made in an effort to provide a fluid mount configured for inhibiting transmission of abnormal noise occurring in a flow path by improving insulation characteristics.

An exemplary embodiment of the present invention are directed to providing an engine mount including a support device which is fastened to an engine; a bracket device which is fastened to a vehicle body; and a vibration proof device which connects the support device and the bracket device, and attenuates vibration transmitted from the engine to the vehicle body, in which the vibration proof device includes a nozzle device which is fastened to the support device, and has a nozzle plate which divides an internal compartment of the vibration proof device into a first liquid chamber and a second liquid chamber, and a flow path which penetrates the nozzle plate; a first insulator which is disposed at one side of the nozzle device, and defines the first liquid chamber together with the nozzle plate; a first core which protrudes from the first insulator toward one side, and is fastened to the bracket device; a second insulator which is disposed at the other side of the nozzle device, and defines the second liquid chamber together with the nozzle plate; and a second core which protrudes from the second insulator toward the other side, and is fastened to the bracket device, and the first insulator and the second insulator are disposed to face each other at both sides of the nozzle device.

The first insulator may be disposed at an upper side of the nozzle device, the first core may protrude upward from the first insulator and may be fastened to an upper portion of the bracket device, the second insulator may be disposed at a lower side of the nozzle device, and the second core may protrude downward from the second insulator and may be fastened to a lower portion of the bracket device.

When the nozzle device is moved upward by the movement of the device, the first insulator may be compressed, and the second insulator may be extended, and when the nozzle device is moved downward by the movement of the support device, the first insulator may be extended, and the second insulator may be compressed.

When the nozzle device is moved upward by the movement of the support device, the fluid in the first liquid chamber may flow to the second liquid chamber via the flow path, and when the nozzle device is moved downward by the movement of the support device, the fluid in the second liquid chamber may flow to the first liquid chamber via the flow path.

The nozzle device may be formed in a cylindrical shape, the flow path may be formed in an annular shape, and the support device may include a vibration proof device fastening portion coupled to an external circumference of the nozzle device.

Each of the first insulator and the second insulator may be formed in a conical shape having an opening at a bottom side thereof, and the openings of the first and second insulators may be disposed to be directed toward the nozzle device, an apex portion of the first insulator may be disposed to be directed toward one side, and an apex portion of the second insulator may be disposed to be directed toward the other side.

The bracket device may include: an upper bracket to which the first core is fastened; a lower bracket which is disposed to face the upper bracket and to which the second core is fastened; a first side bracket which extends from one end portion of the upper bracket to one end portion of the lower bracket; and a second side bracket which is disposed to face the first side bracket, and extends from the other end portion of the upper bracket to the other end portion of the lower bracket, and the vibration proof device may be disposed in a compartment defined by the upper bracket, the lower bracket, the first side bracket, and the second side bracket.

The support device may include a vibration proof device fastening portion which is fastened to an external circumference of the nozzle device, and a first stopper which protrudes from an external circumferential surface of the vibration proof device fastening portion in a radial direction thereof, and a first stopper catching portion, which restricts upward and downward movements of the first stopper, may be provided on the first side bracket.

The first stopper catching portion may include: an upward catching portion which is formed as the first side bracket, which extends downward from one end portion of the upper bracket, is bent toward one side; and a downward catching portion which is formed as the first side bracket, which extends upward from one end portion of the lower bracket, is bent toward one side.

The support device may include a vibration proof device fastening portion which is fastened to an external circumference of the nozzle device, a plurality of protruding portions which protrudes from an external circumferential surface of the vibration proof device fastening portion in a radial direction thereof, and a second stopper which is disposed between the protruding portions, and a second stopper catching portion, which restricts forward and rearward movements of the second stopper, may be disposed on the second side bracket.

The second stopper catching portion may include: a forward catching portion which is disposed at a front side of the second side bracket, and restricts the forward movement of the second stopper; and a rearward catching portion which is disposed at a rear side of the second side bracket, and restricts the rearward movement of the second stopper.

The support device and the bracket device may be manufactured by an aluminum extrusion process.

Another exemplary embodiment of the present invention is directed to providing a method of manufacturing an engine mount, which includes a support device that is fastened to an engine, a bracket device that is fastened to a vehicle body, and a vibration proof device that connects the support device and the bracket device, the method including: manufacturing the support device or the bracket device by an extrusion process; forming a stopper on an external circumference of the support device by a curing process; inserting a vibration proof device into an internal circumference of the support device; and fastening the vibration proof device, which is inserted into the support device, to the bracket device.

The manufacturing of the support device and the bracket device by the extrusion process may manufacture each of the support device and the bracket device by an aluminum extrusion method.

The support device may include a vibration proof device fastening portion on which the vibration proof device is disposed, the forming of the stopper on the external circumference of the support device by the curing process may include attaching the stopper to an external circumferential surface of the vibration proof device fastening portion by the curing process, and the inserting of the vibration proof device into the internal circumference of the support device may include inserting the vibration proof device into an internal circumferential surface of a vibration proof device fastening portion.

The present invention, which is configured as described above, may reduce a level difference even while adopting a circular insulator and a circular flow path, and as a result, it is possible to ensure fluid performance and durability, and to improve the dynamic stiffness of a support.

According to the engine mount of the present invention, the insulators are disposed in series, and as a result, it is possible to improve durability and a damping ratio.

Abnormal noise occurring in the flow path is not transmitted directly to the vehicle body, and may be attenuated by the insulator.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Figure 1A:
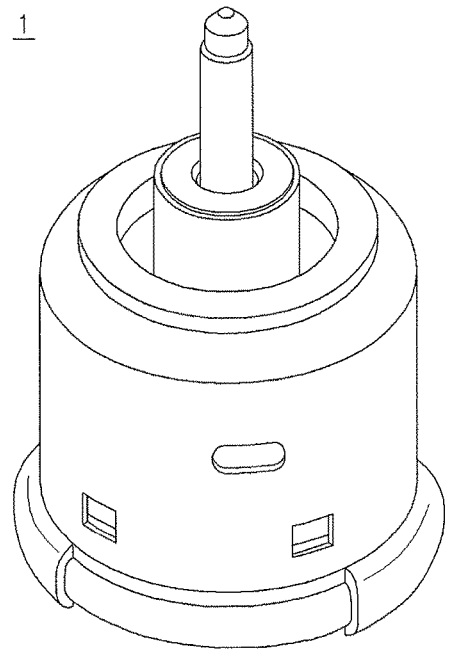
FIG. 1A and FIG. 1B are views illustrating a conical fluid mount in the related art.
Figure 1B:
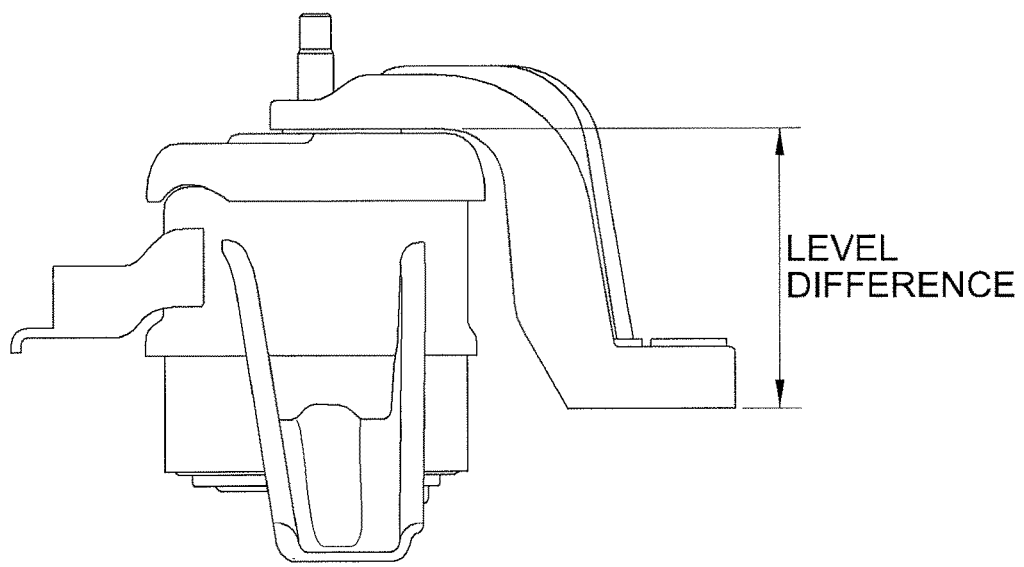
Figure 2A:
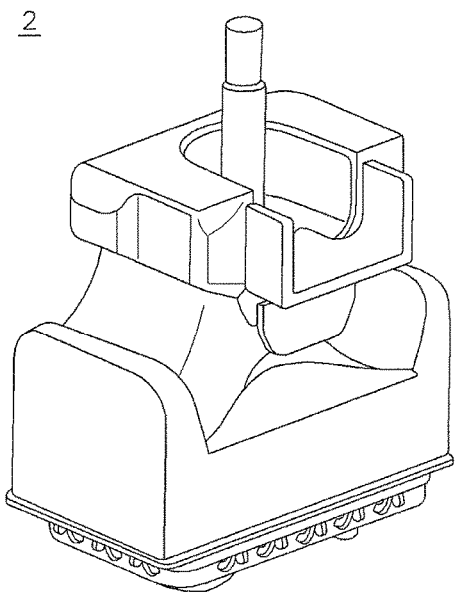
FIG. 2A and FIG. 2B are views illustrating a box-like fluid mount in the related art.
Figure 2B:
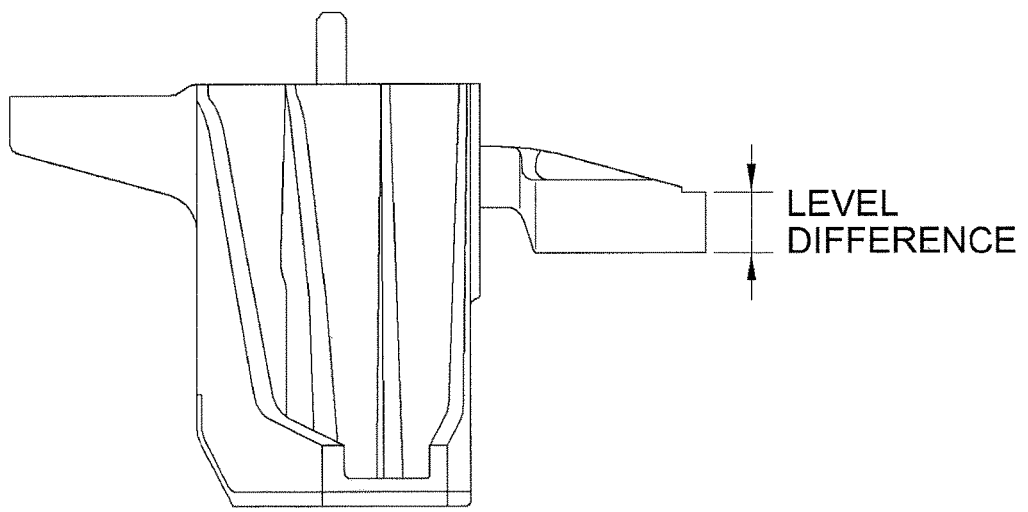
Figure 3:
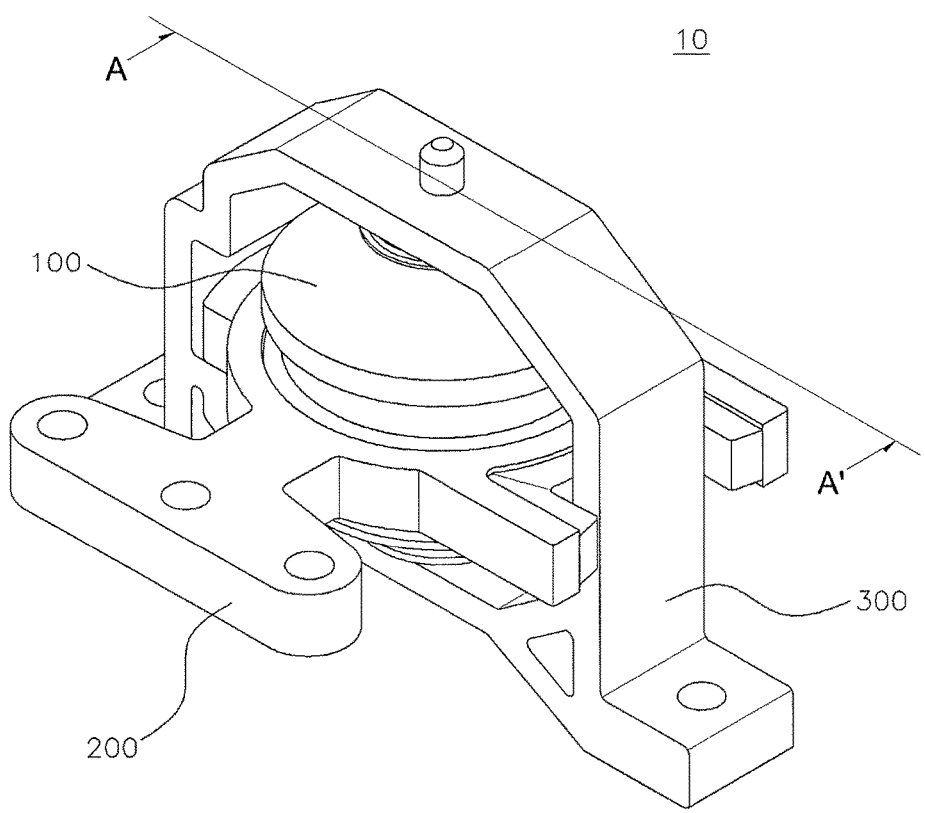
FIG. 3 is a perspective view of an engine mount according to an exemplary embodiment of the present invention.
Figure 4:
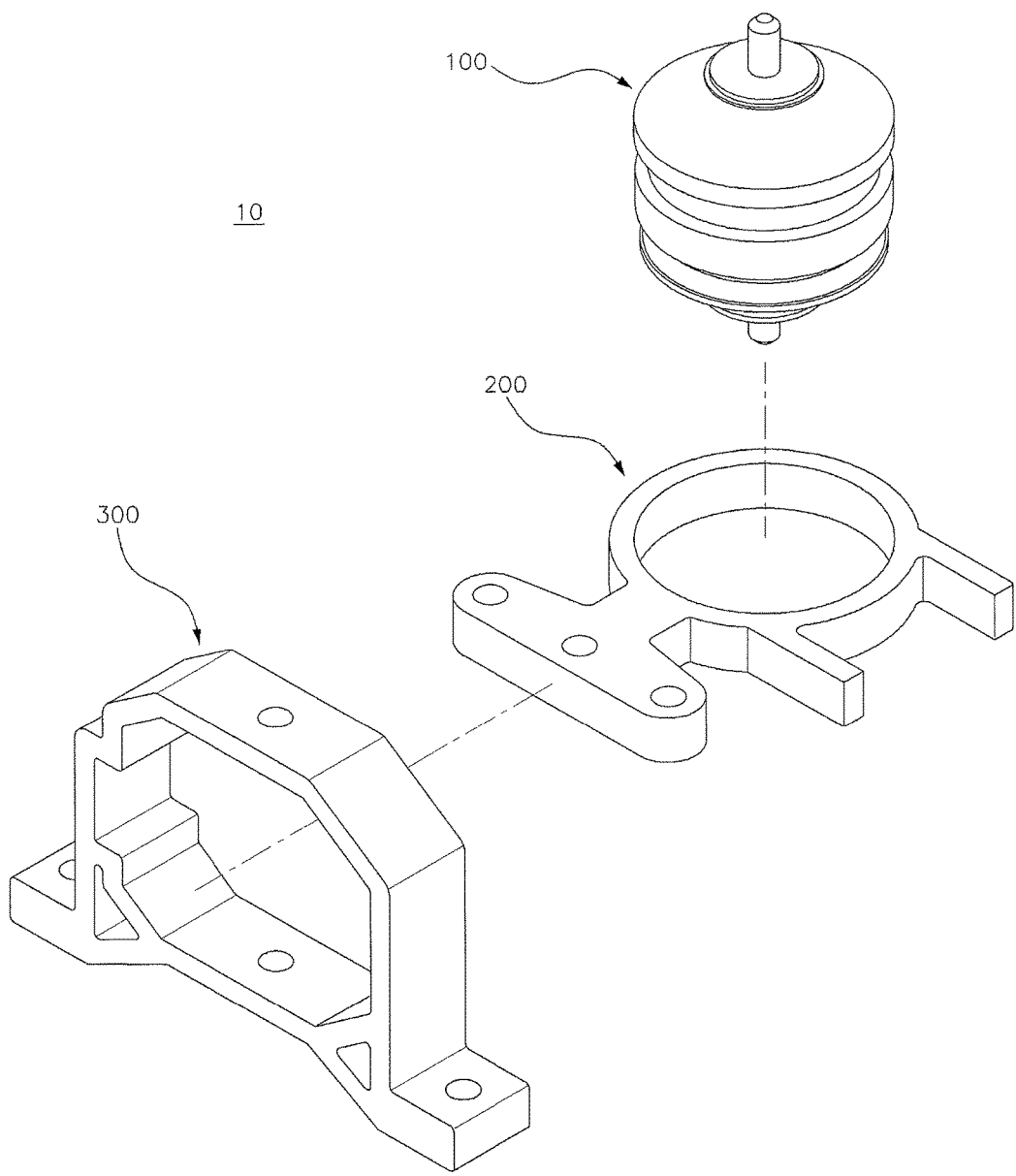
FIG. 4 is an exploded perspective view of the engine mount according to an exemplary embodiment of the present invention.

FIG. 3 is a perspective view of an engine mount according to an exemplary embodiment of the present invention, and FIG. 4 is an exploded perspective view of the engine mount according to an exemplary embodiment of the present invention.

Referring to FIG. 3 and FIG. 4, an engine mount 10 according to an exemplary embodiment of the present invention includes a support device 200 which is connected to an engine of a moving means, a bracket device 300 which is connected to a vehicle body of the moving means, and a vibration proof device 100 which connects the support device 200 and the bracket device 300 and prevents vibration of the engine from being transmitted to the vehicle body. Respective constituent elements of the engine mount 10 and fastening structures between the constituent elements will be described in detail below.

Figure 5:
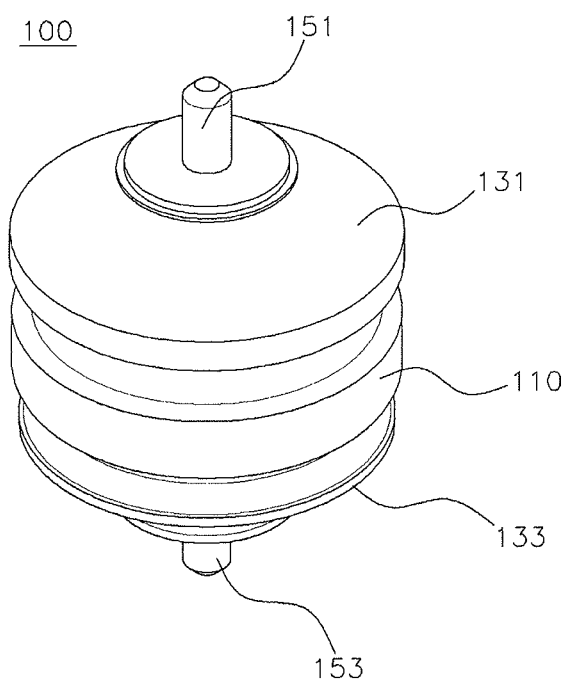
FIG. 5 is a perspective view of a vibration proof device according to an exemplary embodiment of the present invention.
Figure 6:
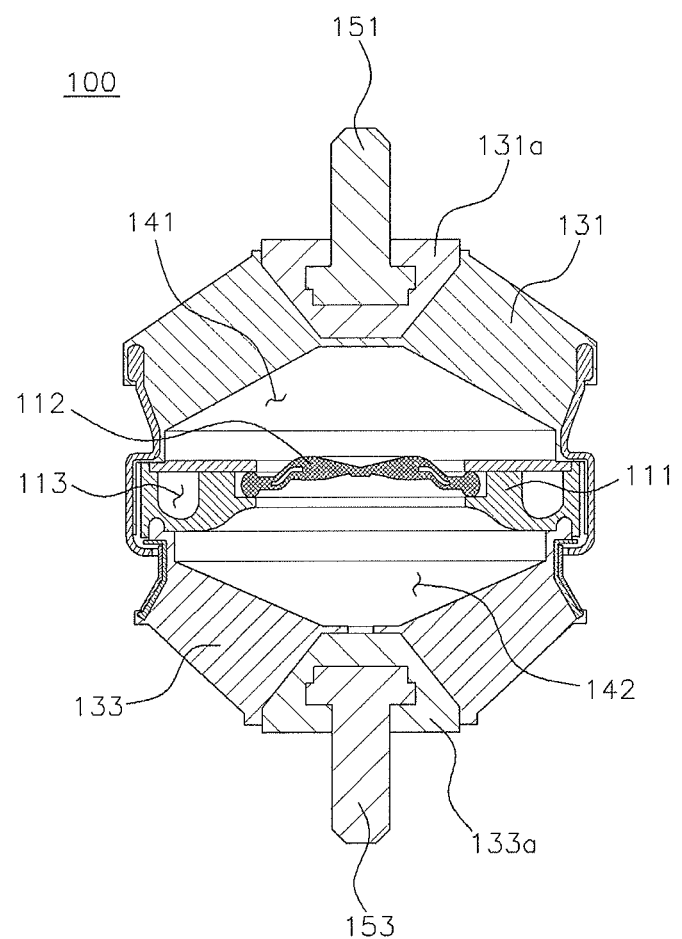
FIG. 6 is a cross-sectional view of the vibration proof device according to an exemplary embodiment of the present invention.

FIG. 5 is a perspective view of the vibration proof device according to an exemplary embodiment of the present invention, and FIG. 6 is a cross-sectional view of the vibration proof device according to an exemplary embodiment of the present invention.

Referring to FIG. 5 and FIG. 6, the vibration proof device 100 includes a nozzle device 110 which is disposed at a central portion of the vibration proof device 100, insulators 131 and 133 which are coupled to both sides of the nozzle device 110, and cores 151 and 153 which fasten the insulators 131 and 133 to the bracket device 300.

The nozzle device 110 may include a nozzle plate 111 which divides an internal compartment of the vibration proof device 100 into a first liquid chamber 141 and a second liquid chamber 142, and flow paths 112 and 113 which are formed to penetrate the nozzle plate 111.

The nozzle plate 111 may be formed in a circular plate shape, an opening may be formed in a central portion of the nozzle plate 111, and a membrane may be disposed in the opening.

Meanwhile, the flow paths 112 and 113 may include a first flow path 112 which is disposed between the central portion of the nozzle plate 111 and the membrane, and a second flow path 113 which is disposed at the rim portion of the nozzle plate 111 and defines an annular flow path. Since the second flow path 113 is formed in an annular shape, fluid performance of the engine mount is superior than that of the box-like fluid mount 2 in the related art.

The first flow path 112 and the second flow path 113 may allow the first liquid chamber 141 and the second liquid chamber 142 to communicate with each other, and a fluid in the first liquid chamber 141 and the second liquid chamber 142 may flow to the first flow path 112 or the second flow path 113 due to a pressure difference between the first liquid chamber 141 and the second liquid chamber 142. As an example, in a case in which a pressure difference between the first liquid chamber 141 and the second liquid chamber 142 is equal to or lower than a reference pressure, the fluid may flow through the first flow path 112, and in a case in which the pressure difference exceeds the reference pressure, the fluid may flow through the second flow path 113.

The insulators 131 and 133 may include a first insulator 131 which is disposed at an upper side of the nozzle device 110, and a second insulator 133 which is disposed at a lower side of the nozzle device 110.

The first insulator 131 and the second insulator 133 may be formed in a conical shape which is opened at a bottom side thereof. In addition, the first insulator 131 may be disposed wherein an opened bottom side thereof is directed toward the nozzle device 110 and the apex portion 131a thereof is directed upward, and the second insulator 133 may be disposed wherein an opened bottom side thereof is directed toward the nozzle device 110 and the apex portion 133a thereof is directed downward.

The apex portions 131a and 133a may refer to portions that define apices of the conical insulators. However, the present invention is not limited thereto, and as illustrated in FIG. 6, the apex portion may refer to a separate constituent element which is coupled to the insulator by being in contact with the insulator.

An opening of the first insulator 131 abuts an upper surface of the nozzle plate 111, and an internal circumferential surface of the first insulator 131 and the upper surface of the nozzle plate 111 define the first liquid chamber 141. Meanwhile, an opening of the second insulator 133 abuts a lower surface of the nozzle plate 111, and an internal circumferential surface of the second insulator 133 and the lower surface of the nozzle plate 111 define the second liquid chamber 142.

The cores 151 and 153 may be disposed at end portions of the insulators 131 and 133. As an example, the cores 151 and 153 may be disposed at the apex portions 131a and 133a of the first insulator 131 and the second insulator 133, respectively. In more detail, the cores 151 and 153 may include a first core 151 which protrudes upward from the apex portion 131a positioned at the upper side of the first insulator 131, and a second core 153 which protrudes downward from the apex portion 133a positioned at the lower side of the second insulator.

The first core 151 and the second core 153 are fastened to the bracket device 300 to be able to fix the vibration proof device 100 and restrict the movement of the vibration proof device 100.

Here, since the cores 151 and 153 are configured to connect the insulators 131 and 133 with the bracket device 300, the cores 151 and 153 are not limited to the term thereof, and the cores 151 and 153 may be understood as 'fastening devices' or 'connecting devices'. In addition, the insulators 131 and 133 are described as being formed in an opened conical shape, but the insulators 131 and 133 may be understood as being formed in a funnel shape.

Figure 7:
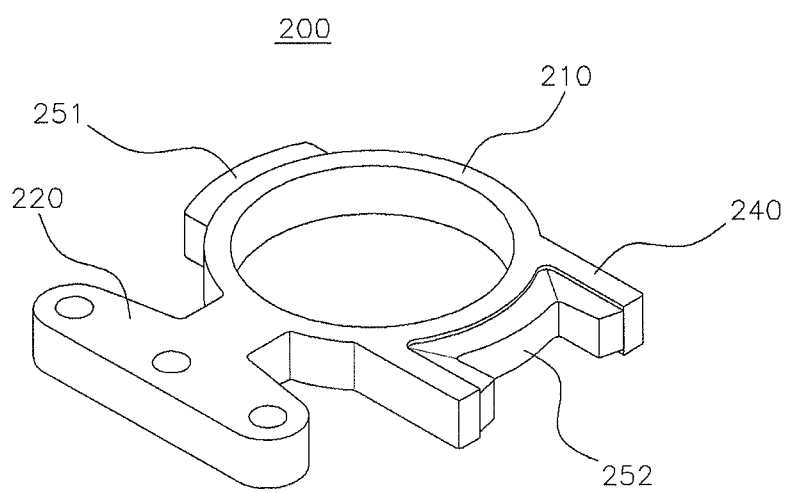
FIG. 7 is a perspective view of a support device according to an exemplary embodiment of the present invention.
Figure 8:
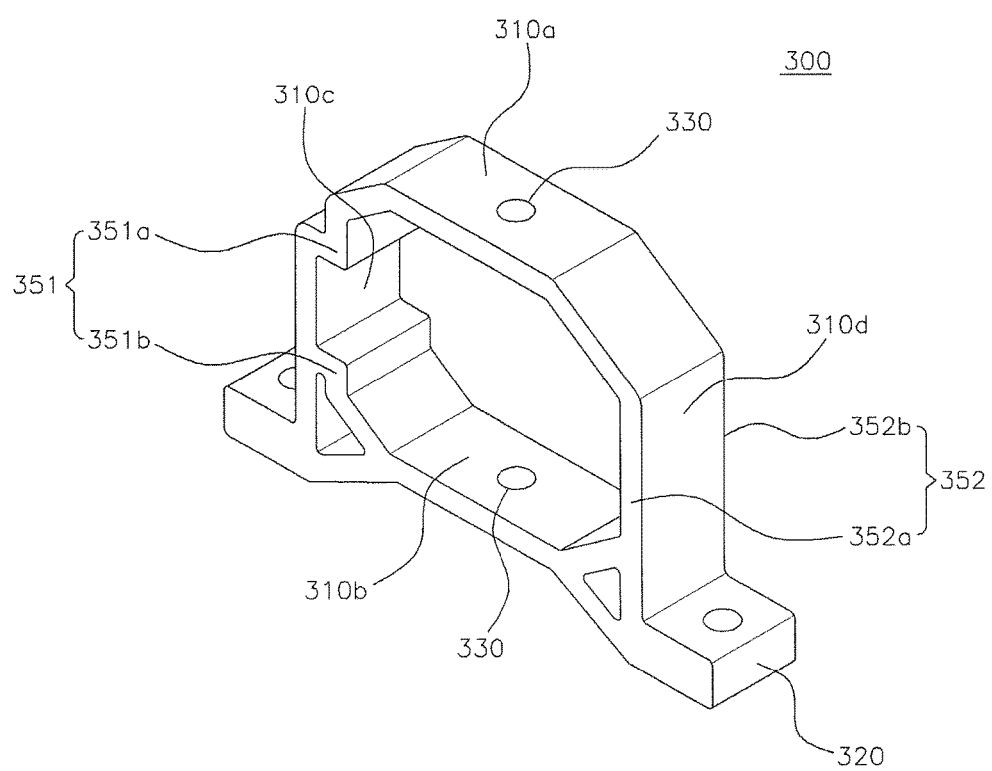
FIG. 8 is a perspective view of a bracket device according to an exemplary embodiment of the present invention.

FIG. 7 is a perspective view of the support device according to the exemplary embodiment of the present invention, and FIG. 8 is a perspective view of the bracket device according to the exemplary embodiment of the present invention.

Referring to FIG. 7 and FIG. 8, the support device 200 includes a vibration proof device fastening portion 210 which fixes the nozzle device 110, and an engine fastening portion 220 which extends from the vibration proof device fastening portion 210 and is fastened to the engine.

The vibration proof device fastening portion 210 may be fastened to an external circumferential surface of the nozzle device 110. In more detail, the vibration proof device fastening portion 210 may be formed in an approximately ring shape, and an internal circumferential surface of the vibration proof device fastening portion 210 may be coupled to the nozzle device to come into contact with the external circumferential surface of the nozzle device.

The engine fastening portion 220 is formed to extend from the vibration proof device fastening portion 210 in one direction. As an example, the engine fastening portion 220 may be formed to extend from the vibration proof device fastening portion 210 in a radial direction.

Meanwhile, the support device 200 may include protruding portions 240 which protrude from the vibration proof device fastening portion 210 in one direction. In the present case, the protruding portions 240 may extend toward a second side bracket 310d to be described below. In addition, the number of protruding portions 240 may be more than one, and the protruding portions 240 may be disposed to be separated apart from each other at a predetermined distance at front and rear sides of the second side bracket 310d.

The support device 200 may include stoppers 251 and 252 which are formed to protrude by a predetermined distance from an external circumferential surface of the vibration proof device fastening portion 210. As an example, the stoppers 251 and 252 may include a first stopper 251 which restricts upward and downward movements of the support device 200, and a second stopper 252 which restricts leftward and rightward movements of the support device 200.

The second stopper 252 may be formed between the plurality of protruding portions 240. The second stopper 252 may be formed to extend from one surface of one protruding portion 240 to one surface of the other protruding portion 240. In the case, the second stopper 252 may extend in a state of being in contact with the external circumferential surface of the vibration proof device fastening portion 210, and the second stopper 252 may be formed in an approximately U-shape when viewed from the top side.

Meanwhile, since all of the engine fastening portion 220 and the protruding portions 240 extend in the radial direction of the vibration proof device fastening portion 210, all of the engine fastening portion 220 and the protruding portions 240 may be disposed on a single plane parallel to a ground surface based on FIG. 7. The advantage of the present shape is that the support device 200 may be manufactured by an extrusion method.

The operations of the first stopper 251 and the second stopper 252 will be described below together with the bracket device 300 to be described below.

The bracket device 300 includes a bracket main body 310 to which the vibration proof device 100 is fastened, and vehicle body fastening portions 320 which extend from the bracket main body 310 and are fastened to the vehicle body of the moving means.

The bracket main body 310 includes an upper bracket 310a which defines an upper side of the bracket main body 310, a lower bracket 310b which faces the upper bracket 310a and defines a lower side of the bracket main body 310, a first side bracket 310c which extends from one end portion of the upper bracket 310a to one end portion of the lower bracket 310b, and the second side bracket 310d which extends from the other end portion of the upper bracket 310a to the other end portion of the lower bracket 310b.

The bracket main body 310 is opened at both sides thereof, and configured wherein the upper bracket 310a, the lower bracket 310b, the first side bracket 310c, and the second side bracket 310d define upper and lower surfaces and both lateral surfaces of the bracket main body 310, respectively. In the present case, the upper bracket 310a and the lower bracket 310b may include surfaces facing the vehicle body, and the first side bracket 310c and the second side bracket 310d may include surfaces perpendicular to the surfaces facing the vehicle body.

The vehicle body fastening portion 320 may extend in a direction identical to a direction in which the upper bracket 310a and the lower bracket 310b extend, and the upper bracket 310a, the lower bracket 310b, the first side bracket 310c, the second side bracket 310d, and the vehicle body fastening portions 320 may be disposed on a plane perpendicular to the ground surface based on FIG. 8. The advantage of the present structure is that the bracket device 300 may be manufactured by an extrusion method.

Vibration proof device fastening holes 330, which penetrate the upper bracket 310a and the lower bracket 310b in an up and down direction thereof, may be disposed in the upper bracket 310a and the lower bracket 310b. The first core 151 may be penetratively fixed to the vibration proof device fastening hole 330 disposed in the upper bracket 310a, and the second core 153 may be penetratively fixed to the vibration proof device fastening hole 330 disposed in the lower bracket 310b. Therefore, the upper bracket 310a and the lower bracket 310b fix the vibration proof device 100 to the bracket device 300.

Meanwhile, a first stopper catching portion 351 may be disposed on the first side bracket 310c. The first stopper catching portion 351 may be formed in a 'U'-shape when viewed from one side thereof, and the first stopper catching portion 351 may be formed by bending the first side bracket 310c.

That is, the first stopper catching portion 351 may include an upward catching portion 351a which is formed as the first side bracket 310c, which extends downward from one end portion of the upper bracket 310a, is bent toward one side, and a downward catching portion 351b which is formed as the first side bracket 310b, which extends upward from one end portion of the lower bracket 310b, is bent toward one side.

The upward catching portion 351a restricts an upward movement of the first stopper 251, and the downward catching portion 351b restricts a downward movement of the first stopper 251, thereby restricting the upward and downward movements of the support device 200.

Meanwhile, a second stopper catching portion 352 may be disposed on the second side bracket 310d. The second stopper catching portion 352 may be understood as being two surfaces of the second side bracket 310d which face each other. That is, the second stopper catching portion 352 includes a forward catching portion 352a which is disposed at a front side of the second side bracket 310d and restricts a rearward movement of the second stopper 252, and a rearward catching portion 352b which is disposed at a rear side of the second side bracket 310d and restricts a forward movement of the second stopper 252.

The first stopper catching portion 351 and the second stopper catching portion 352 restrict the movements of the first stopper 251 and the second stopper 252, preventing the support device 200 from moving out of a predetermined range. Meanwhile, the first stopper 251 and the second stopper 252 may include an elastic material.

Figure 9:
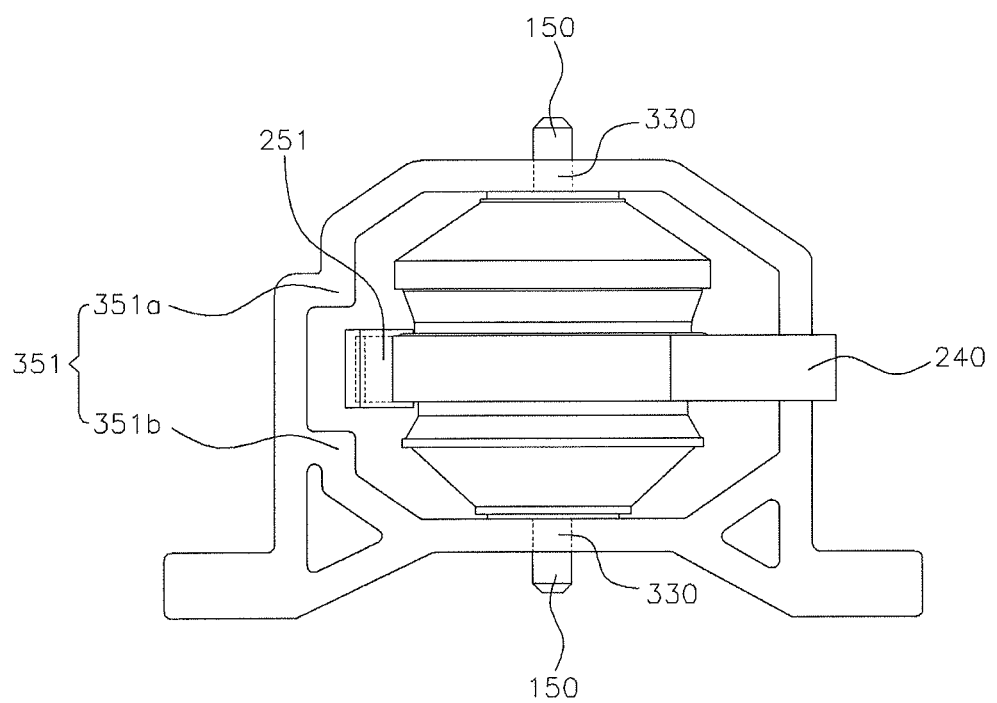
FIG. 9 is a front view of the engine mount according to an exemplary embodiment of the present invention.
Figure 10:
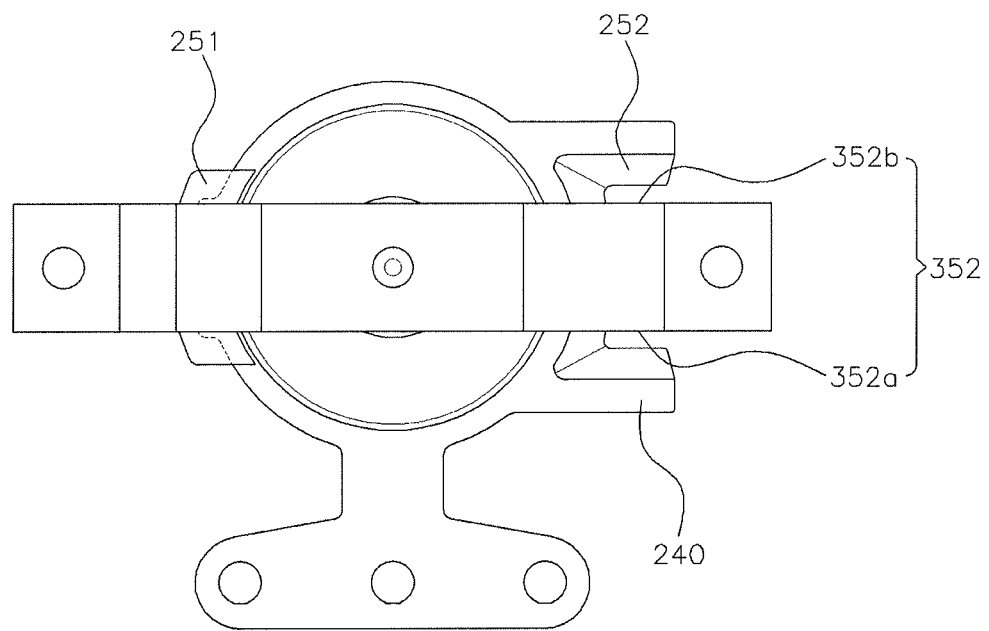
FIG. 10 is a top plan view of the engine mount according to an exemplary embodiment of the present invention.

FIG. 9 is a front view of the engine mount according to an exemplary embodiment of the present invention, and FIG. 10 is a top plan view of the engine mount according to an exemplary embodiment of the present invention.

Referring to FIG. 9 and FIG. 10, the first core 151 disposed at an upper end portion of the vibration proof device 100 and the second core 153 at a lower end portion of the vibration proof device 100 are inserted into the vibration proof device fastening holes 330 formed in upper and lower portions of the bracket device 300.

In the present case, the vibration proof device 100 is disposed in an opened internal compartment of the bracket device 300. The first stopper 251 formed at one side of the support device 200 is disposed to correspond to the first stopper catching portion 351 formed at one side of the bracket device 300. When the vibration proof device 100 moves in the up and down direction by a predetermined distance, the upper or lower portion of the first stopper 251 comes into contact with the first stopper catching portion 351, and as a result, it is possible to prevent the vibration proof device 100 from moving a predetermined or longer distance.

Meanwhile, the second stopper 252 formed at the other side of the support device 200 is disposed to correspond to the second stopper catching portion 352 formed at the other side of the bracket device 300. When the vibration proof device 100 moves in the left and right direction by a predetermined distance, one side of the second stopper 252 comes into contact with the second stopper catching portion 352, and as a result, it is possible to prevent the vibration proof device 100 from moving a predetermined or longer distance.

Figure 11:
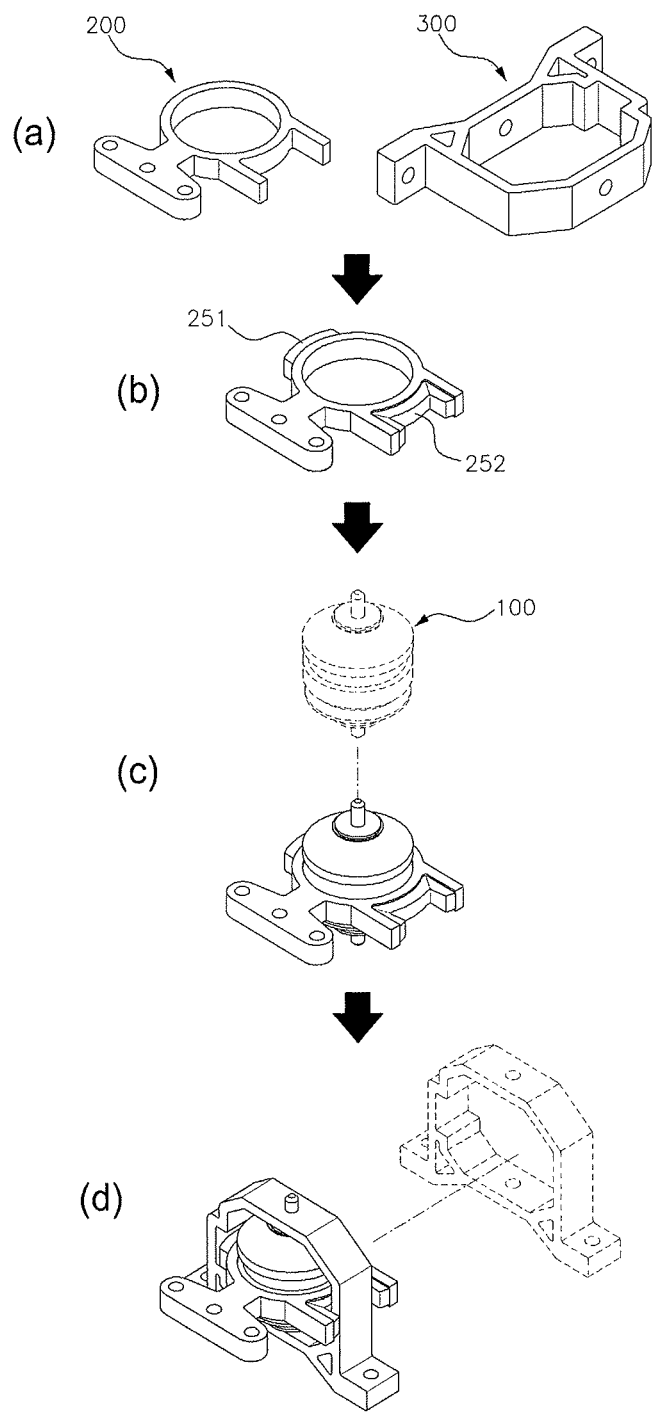
FIG. 11 is a view diagrammatically illustrating a method of manufacturing the engine mount according to an exemplary embodiment of the present invention.

FIG. 11 is a view diagrammatically illustrating a method of manufacturing the fluid mount according to an exemplary embodiment of the present invention. Referring to FIG. 11, first, the support device 200 and the bracket device 300 are formed by an extrusion method (step a).

Since the support device 200 and the bracket device 300 may be disposed on the single plane as described above, the support device 200 and the bracket device 300 may be manufactured through an extrusion process. As an example, the extrusion method may be an aluminum extrusion method. When the support device 200 and the bracket device 300 are formed by the aluminum extrusion method, it is advantageous in view of quality variation because tissue is dense, and there is a great advantage in terms of production costs because the process is simplified.

Thereafter, the first stopper 251 and the second stopper 252 are formed, by a curing process, on the support device 200 formed by the aluminum extrusion (step b). In the present case, the first stopper 251 and the second stopper 252 may be formed on the external circumferential surface of the vibration proof device fastening portion 210.

The vibration proof device 100 is manufactured by forming the insulators 131 and 133 at both sides of the nozzle device 110 by a curing process, and the manufactured vibration proof device 100 is press-fitted into and assembled to the support device 200 (step c). In the present case, the manufactured vibration proof device 100 may be press-fitted into the support device 200 so that the external circumferential surface of the nozzle device 110 comes into contact with the internal circumferential surface of the vibration proof device fastening portion 210.

Finally, the vibration proof device 100, which is inserted into the support device 200, is assembled to the bracket device 300 (step d). In the present case, the vibration proof device 100 and the bracket device 300 may be assembled by inserting the cores 151 and 153, which are provided at the apex portions of the insulators 131 and 133, into the vibration proof device fastening holes 330, respectively.

According to the method of manufacturing the fluid mount according to an exemplary embodiment of the present invention, the support device 200 and the bracket device 300 may be manufactured by the extrusion method, so that it is possible to improve rigidity of the support device 200 and the bracket device 300, and to simply assemble the vibration proof device 100 to the bracket device 300, improving productivity.

Figure 12:
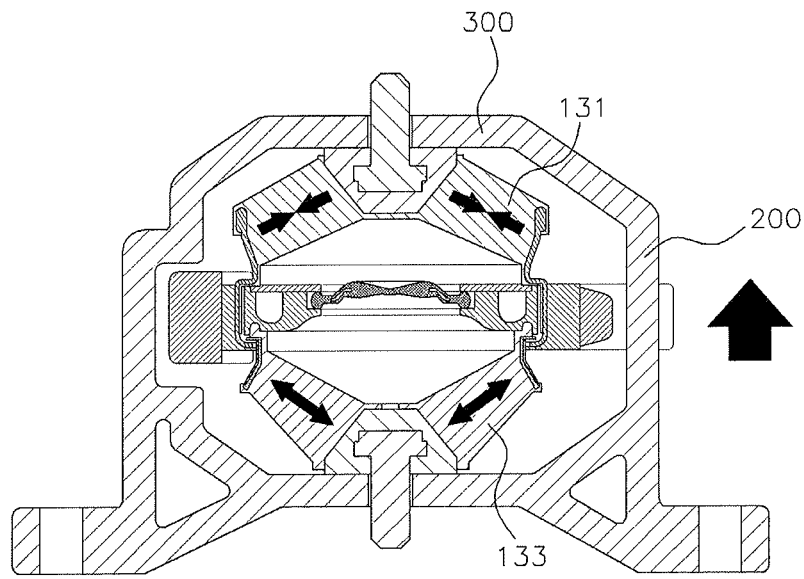
FIG. 12 and FIG. 13 are views illustrating a structure of the engine mount when the bracket device according to an exemplary embodiment of the present invention moves in an up and down direction thereof.
Figure 13:
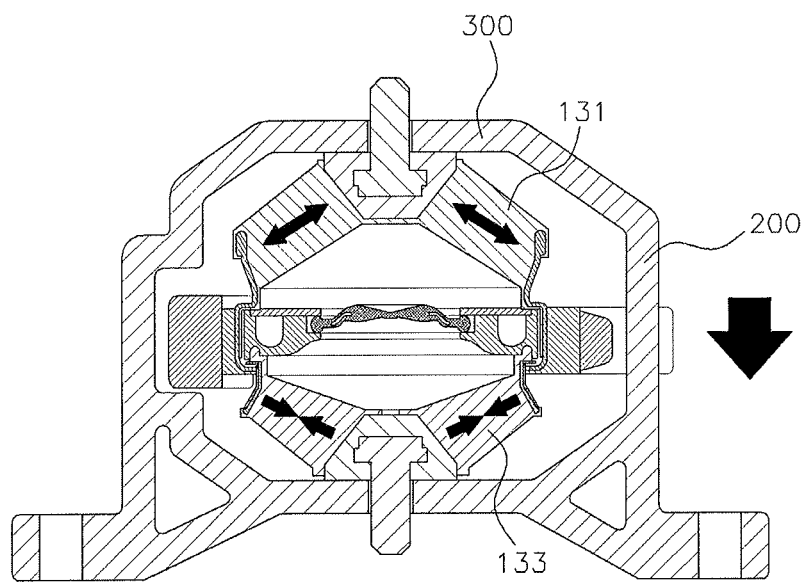

FIG. 12 is a view illustrating a structure of the engine mount when the bracket device according to the exemplary embodiment of the present invention moves upward, and FIG. 13 is a view illustrating a structure of the engine mount when the bracket device according to the exemplary embodiment of the present invention moves downward.

Referring to FIG. 12 and FIG. 13, the vibration proof device 100 according to an exemplary embodiment of the present invention has the insulators 131 and 133 at both sides based on the nozzle device 110, and as a result, when the nozzle device 110 is moved in one direction, one insulator is extended, and the other insulator is compressed, improving durability.

As an example, when the nozzle device 110 is moved upward as the support device 200 moves upward, the first insulator 131, which is disposed at the upper side of the nozzle device 110, may be compressed, and the second insulator 133, which is disposed at the lower side of the nozzle device 110, may be extended, as illustrated in FIG. 12. In the case, the fluid in the first liquid chamber 141 flows to the second liquid chamber 142 via the flow paths 112 and 113.

On the contrary, when the nozzle device 110 is moved downward as the support device 200 moves downward, the first insulator 131, which is disposed at the upper side of the nozzle device 110, may be extended, and the second insulator 133, which is disposed at the lower side of the nozzle device 110, may be compressed, as illustrated in FIG. 13. In the present case, the fluid in the second liquid chamber 142 flows to the first liquid chamber 141 through the flow paths 112 and 113.

The vibration proof device 100 according to an exemplary embodiment of the present invention may have a greater damping ratio and higher durability since the plurality of insulators are disposed in series at the upper and lower sides of the nozzle device.

Meanwhile, in the case of a structure in the related art, noise, which is caused by cavitation occurring in a flow path and rattling of the membrane, may be transmitted directly to the vehicle body through an external wall of the mount, but in the case of the vibration proof device 100 according to an exemplary embodiment of the present invention, since the insulators are disposed at the upper and lower sides of the nozzle device, and thus noise occurring in a flow path is insulated by passing through the insulators, it is possible to minimize abnormal noise being transmitted to the vehicle body.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine mount comprising:
a support device which is fastened to an engine;
a bracket device which is fastened to a vehicle body; and
a vibration proof device which connects the support device and the bracket device, and attenuates vibration transmitted from the engine to the vehicle body,
wherein the vibration proof device includes:
a nozzle device which is fastened to the support device, and has a nozzle plate which divides an internal compartment of the vibration proof device into a first liquid chamber and a second liquid chamber, and a flow path which penetrates the nozzle plate;
a first insulator which is provided at a first side of the nozzle device, and defines the first liquid, chamber together with the nozzle plate;
a first core which protrudes froth the first insulator toward a first side, and is fastened to the bracket device;
a second insulator which is provided at a second side of the nozzle device, and defines the second liquid chamber together with the nozzle plate; and
a second core which protrudes from the second insulator toward a second side, and is fastened to the bracket device, and
wherein the first insulator and the second insulator are disposed to face each other at the first side and the second side of the nozzle device.

2. The engine mount of claim 1, whereinthe first insulator is disposed at an upper side of the nozzle device, the first core protrudes upward from the first insulator and is fastened to an upper portion of the bracket device, the second insulator is disposed at a lower side of the nozzle device, and the second core protrudes downward from the second insulator and is fastened to a lower portion of the bracket device.

3. The engine mount of claim 2, wherein when the nozzle device is moved upward by a movement of the support device, the first insulator is compressed, and the second insulator is extended, and when the nozzle device is moved downward by a movement of the support device, the first insulator is extended, and the second insulator is compressed.

4. The engine mount of claim 3, wherein when the nozzle device is moved upward by a movement of the support device, a fluid in the first liquid chamber flows to the second liquid chamber via the flow path, and when the nozzle device is moved downward by a movement of the support device, a fluid in the second liquid chamber flows to the first liquid chamber via the flow path.

5. The engine mount of claim 1, wherein the nozzle device is formed in a cylindrical shape, the flow path is formed in an annular shape, and the support device includes a vibration proof device fastening portion coupled to an external circumference of the nozzle device.

6. The engine mount of claim 5, wherein each of the first insulator and the second insulator is formed in a conical shape having an opening at a bottom side thereof, and the openings of the first and second insulators are disposed to be directed toward the nozzle device, an apex portion of the first insulator is disposed to be directed toward a first side, and an apex portion of the second insulator is disposed to be directed toward a second side.

7. The engine mount of claim 2, wherein the bracket device includes:
an upper bracket to which the first core is fastened;
a lower bracket which is disposed to face the upper bracket and to which the second core is fastened;
a first side bracket which extends from a first end portion of the upper bracket to a first end portion of the lower bracket; and
a second side bracket which is disposed to face the first side bracket, and extends from a second end portion of the upper bracket to a second end portion of the lower bracket, and
wherein the vibration proof device is disposed in a space defined by the upper bracket, the lower bracket, the first side bracket, and the second side bracket.

8. The engine mount of claim 7, wherein the support device includes a vibration proof device fastening portion which is fastened to an external circumference of the nozzle device, and a first stopper which protrudes from an external circumferential surface of the vibration proof device fastening portion in a radial direction thereof, and a first stopper catching portion, which restricts upward and downward movements of the first stopper, is provided on the first side bracket.

9. The engine mount of claim 8, wherein the first stopper catching portion includes:
an upward catching portion which is formed as the first side bracket, which extends downward from a first end portion of the upper bracket, is bent toward a first side; and
a downward catching portion which is formed as the first side bracket, which extends upward from a first end portion of the lower bracket, is bent toward a first side.

10. The engine mount of claim 7, wherein the support device includes a vibration proof device fastening portion which is fastened to an external circumference of the nozzle device, a plurality of protruding portions which protrudes from an external circumferential surface of the vibration proof device fastening portion in a radial direction thereof, and a second stopper which is mounted between the protruding portions, and a second stopper catching portion, which restricts forward and rearward movements of the second stopper, is provided on the second side bracket.

11. The engine mount of claim 10, wherein the second stopper catching portion includes:
a forward catching portion which is provided at a front side of the second side bracket, and restricts the rearward movement of the second stopper; and
a rearward catching portion which is provided at a rear side of the second side bracket, and restricts the forward movement of the second stopper.

12. The engine mount of claim 1, wherein the support device and the bracket device are manufactured by an aluminum extrusion process.

* * * * *